P

(12) United States Patent
Hainline et al.

(10) Patent No.: US 10,553,020 B1
(45) Date of Patent: Feb. 4, 2020

(54) SHADOW MASK GENERATION USING ELEVATION DATA

(71) Applicant: Raytheon Company, Waltham, MA (US)

(72) Inventors: Allen Hainline, Rowlett, TX (US); Richard W. Ely, Lewisville, TX (US)

(73) Assignee: Ratheon Company, Waltham, MA (US)

( * ) Notice: Subject to any disclaimer, the term of this patent is extended or adjusted under 35 U.S.C. 154(b) by 18 days.

(21) Appl. No.: 15/926,285

(22) Filed: Mar. 20, 2018

(51) Int. Cl.
*G06T 15/60* (2006.01)
*G06T 17/05* (2011.01)

(52) U.S. Cl.
CPC .............. *G06T 15/60* (2013.01); *G06T 17/05* (2013.01); *G06T 2215/12* (2013.01); *G06T 2215/16* (2013.01)

(58) Field of Classification Search
CPC .................................. G06T 15/60; G06T 17/05
USPC ........................................................ 345/426
See application file for complete search history.

(56) References Cited

U.S. PATENT DOCUMENTS

2007/0098290 A1* 5/2007 Wells ...................... G06T 11/00 382/254
2007/0195089 A1* 8/2007 Furukado ................ G06T 17/05 345/426
2015/0097834 A1* 4/2015 Ma .......................... G06T 17/05 345/426
2017/0076456 A1* 3/2017 Goodman ............... G06T 15/60

OTHER PUBLICATIONS

Jain and Khunteta, "Shadow Removal for Umbrageous Information Recovery in Aerial Images" Jul. 1-2, 2017, 2017 International Conference on Computer, Communications and Electronics (Comptelix) Manipal University Jaipur, Malaviya National Institute of Technology Jaipur & IRISWORLD, pp. 536-540.*

* cited by examiner

*Primary Examiner* — Hai Tao Sun
(74) *Attorney, Agent, or Firm* — Schwegman Lundberg & Woessner, P.A.

(57) ABSTRACT

A method can include determining, based on elevation data of a geographic region corresponding to a location at which an image was captured and a solar elevation angle at a time the image was captured, whether each pixel of the image is a shadow or a non-shadow to create a shadow mask of the image, generating an eroded shadow mask that includes the shadow mask with a specified number of pixels from a perimeter of each shadow in the shadow mask changed to respective values corresponding to non-shadows, generating a dilated shadow mask that includes the specified number of pixels in the shadow mask changed to values corresponding to shadows, and refining the shadow mask using the eroded shadow mask and the dilated shadow mask to create a refined shadow mask.

17 Claims, 14 Drawing Sheets

1300

US 10,553,020 B1

SHADOW MASK GENERATION USING ELEVATION DATA

GOVERNMENT RIGHTS

This invention was made with Government support under Contract Number 11-C-0819. The Government has certain rights in this invention.

TECHNICAL FIELD

Embodiments discussed herein regard devices, systems, and methods for generating and refining a shadow mask of an image.

BACKGROUND 3D point sets, such as derived from light detection and ranging (LiDAR) or from passive electro-optical sources, can be used to guide identification of shadows in images. Prior attempts at generating a shadow mask generally focus on simple techniques, such as comparing a pixel intensity to a threshold value and setting the pixel value in a shadow mask to a value corresponding to a shadow value. Techniques that use 3D knowledge to identify shadows do not work well with point clouds that contain inaccuracies.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

DETAILED DESCRIPTION

Figure 1:
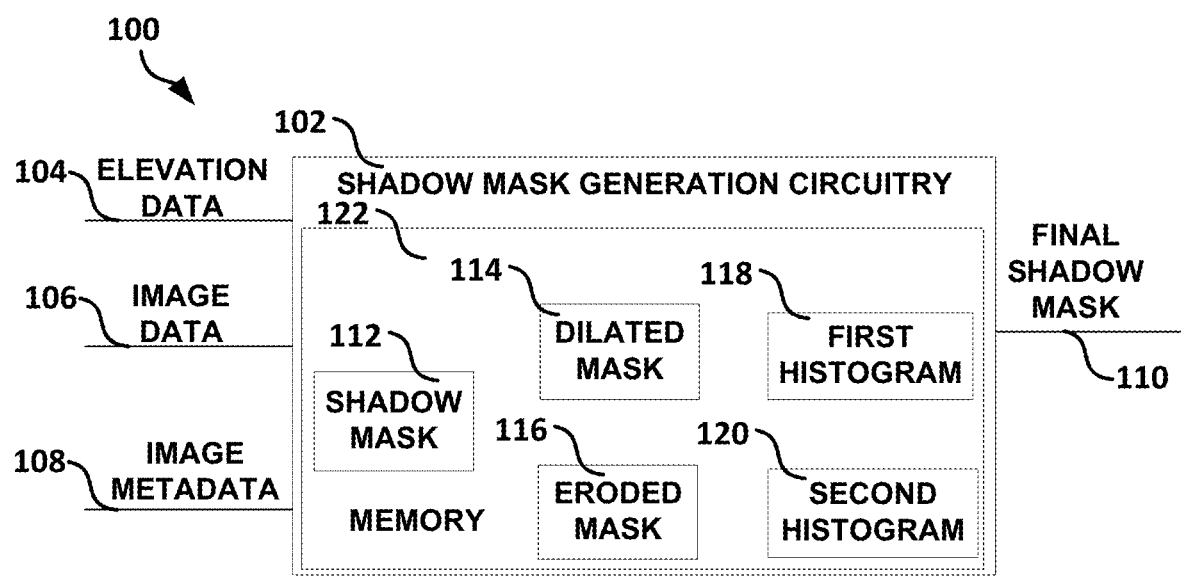
FIG. 1 illustrates, by way of example, an embodiment of a system for creating a shadow mask.

Embodiments generally relate to generating context masks for images. The context masks can be for one or more shadows of one or more images. The context masks can be generated based on elevation data and image data. The context masks can be generated in a solar ray coordinate system that can simplify a prediction of whether a pixel in the image data is expected to be a shadow or non-shadow. The context masks can be generated based on an eroded shadow mask and a dilated shadow mask. The context masks can be generated based on histograms of pixels that are shadows (with high confidence) and non-shadows (with high confidence). The generated shadow mask can be more accurate than previous shadow masks and can aid in object detection, recognition, change detection, terrain classification and/or attribution of points in a 3D point set, among other applications.

Embodiments herein can make use of elevation data in creating a context layer derived. The elevation data can be derived from a high-resolution 3D point source, either from an active sensor such as LiDAR, or a passive 3D point set derived from images, or from some other sources. The context layer can be useful for enhanced change detection but also for other techniques that use 3D data, such as volumetric change detection and bare earth determination techniques. The context layer can be used to refine and improve the extraction of the point cloud and/or the attribution of the point cloud. For example, a shadow mask can be used to exclude pixel intensities in shadows from being used for the intensity attribution of the point clouds, at least in cases where non-shadow pixels are available at that location.

A shadow mask can include an image where each pixel value represents a probability that the given pixel location is a non-shadow expressed as a percentage between 0 and 100. This convention provides shadows displayed as dark values (0) in the mask, which facilitates visual validation by switching between the mask and the image. Other conventions can be employed, depending on the application and the goals.

The 3D point cloud can be registered to the image space, such as to mitigate geo-positioning inconsistencies between the 3D point cloud and the image space. Shadow mask generation can include setting up a coordinate system that is oriented such that solar rays are in the direction along each image row from left-to-right (perpendicular to a direction in which columns of pixels are oriented). This allows shadow decisions to be efficiently and accurately made per pixel by tracking whether the height of a solar ray at a given column exceeds a height at that column or is otherwise occluded. These shadow decisions can be projected back to the image space to obtain a shadow mask in image space. Due to inaccuracies in at least one of the point cloud and the projections, this initial shadow mask can be treated merely as a starting point.

A shadow refinement technique can be performed (e.g., iteratively) to improve the shadow mask. Only regions of the image identified as being the most likely to need refinement can be part of the refinement. This is determined by morphological filtering that erodes and dilates the initial shadow mask. The eroded shadow mask stays as shadow and pixels outside shadow in the dilated shadow mask are fixed as being non-shadow. Regions that differ between the eroded and dilated masks can change during the refinement process. The amount of erosion and dilation can depend on the solar elevation angle and geo-positioning accuracy.

FIG. 1 illustrates, by way of example, an embodiment of a system 100 for creating a shadow mask 110. The system 100 includes shadow mask generation circuitry 102. The shadow mask generation circuitry 102 can include one or more central processing units (CPUs), graphics processing units (GPUs), field programmable gate arrays (FPGAs), application specific integrated circuits (ASICs), or electric or electronic components configured to perform operations of generating the shadow mask 110. The electric or electronic components can include one or more resistors, transistors, inductors, capacitors, diodes, regulators, multiplexers, switches, oscillators, logic gates (e.g., AND, OR, XOR, negate, or the like), a buffer, memory, or the like. The shadow mask generation circuitry 102 can receive elevation data 104, image data 106, and image metadata 108. The shadow mask generation circuitry 102 can produce the shadow mask 110 based on the elevation data 104, image data 106, or image metadata 108.

The elevation data 104 can include point cloud data or digital surface model (DSM) data. DSM data includes a surface as built. Point cloud data includes data points that include X, Y, and Z information (e.g., latitude, longitude, and height, or UTM coordinates or the like). Point cloud data is typically created using a three-dimensional (3D) scanner or derived passively from two or more images of the scene. DSM data includes data similar to the point cloud.

The image data 106 includes pixel values, multispectral or panchromatic, for a geographical region in a field of view of an imaging device (e.g., a camera). The image data 106 can include a single number representing a grayscale value or an array of values representing respective bands (e.g., red, blue, and green, or other bands). Usually a larger pixel value corresponds to a brighter response or higher amplitude. For example, a value of zero, represents black and 255 (in eight-bit representations) represents white.

The image metadata 108 includes geographical location data, such as latitude and longitude, global positioning system (GPS) coordinates, or the like. The image metadata can include solar angle information or image collection time that can be used to determine solar angle. The solar angle of interest to embodiments herein is the angle of the sun relative to an axis of a coordinate system of the image data 106. Typically, however, the metadata includes the solar angle with respect a ground coordinate system rather than the coordinate system of the image data. Thus, the solar angle of the metadata can be adjusted to the axis of the coordinate system of the image data 106.

The final shadow mask 110 and a shadow mask 112 are images in which each pixel value represents the probability that the given pixel location is a non-shadow expressed as a percentage between 0 and 100. This convention was chosen so that shadows would be displayed as dark values (0) in the mask, which facilitates visual validation by flickering between the mask and the image. This mask could be provided in original as-collected space or could be output in a ground-based projection.

The shadow mask generation circuitry 102 produces the shadow mask 112, a dilated mask 114, an eroded mask 116, a shadow histogram 118, a non-shadow histogram 120, and a final shadow mask 110. The shadow mask 112 is an initial estimate as to which pixels of the image data 106 correspond to shadow. The dilated mask 114 includes the shadows of the shadow mask 112 extended in all directions by a specified number of pixels. The eroded mask 116 includes the shadows of the shadow mask reduced in all directions by a specified number of pixels. The shadow mask that is used as a basis for the dilated mask 114 and the eroded mask 116 can be different. For example, the shadow mask that forms the basis for the dilated mask 114 can include more shadows (a higher threshold value for what is considered a shadow) than the shadow mask that forms the basis for the eroded mask 116.

The shadow histogram 118 includes counts split into bins of the intensities of all pixels that are confidently shadows based on the eroded shadow mask 116 and the image data 106. For example, each bin can include counts of pixels with values of a specified range (e.g., 8 values, 16 values, 32 values, etc. or other range). For example, in an image in which each pixel intensity is represented by a number [0, 255] the bins of the shadow histogram can be single intensities or be groups of consecutive intensities, such as [0, 15], [16, 31], [32, 47], [48, 63], [64, 79], [80, 95], [96, 111], [112, 127], [128, 143], [144, 159], [160, 175], [176, 191], [192, 207], [208, 223], [224, 239], and [240, 255]. If histogramming is performed into single bins (e.g., without remapping intensities to reduce the number of bins) smoothing of the counts in the histogram can performed if the average counts per bin is not sufficiently high to ensure a statistically significant number of counts in any bin that may be later used in probability estimates.

The non-shadow histogram 120 is similar to the shadow histogram 118 but includes pixel intensity counts split into bins of all pixels that are confidently non-shadows based on the dilated shadow mask 114 and the image data 106.

An image coordinate system (sometimes called an input image space) is the native, as-collected image space. This space can be defined either by a raw frame camera image represented by the image data 106 or, for some types of satellite platforms, a modified image. The modified image can include using synthetic array generation needed to produce a seamless image that includes corrections for chip-to-chip and band-to-band misregistration.

A solar-oriented coordinate system is a ground-based coordinate system in either a map projection or a geodetic space (fixed latitude/longitude spacing per pixel). The spacing per dimension can approximately square pixels (e.g., meters per pixel can be as close to the same in each dimension as is possible in the projection). The orientation of the solar coordinate system can be such that solar rays travel approximately along rows from left to right. Note that long image collects can be split into sub-images that are processed separately to minimize the variance of solar rays within an image being processed. The solar azimuth angle thus defines the rotation of the coordinate system relative to a north-up system. The range of coordinate values can match the size of the image, the elevation data, the intersection of the image with the elevation coverage, or based on a user-specified region.

In embodiments, elevation data 104 can be available beyond the image region in the direction upstream of solar rays so that shadows can be accurately determined all the way to border pixels. Spacing can be based on the minimum of the native image resolution and the elevation data resolution. However, a slightly higher resolution than this can help improve the results, especially for embodiments where the elevation data is reasonably accurate. In such embodiments, the ground sample distance can be about 0.8 times the native ground sample distance. This orientation later saves processing time by making the computation of the maximum height of obstructed solar rays throughout the image more efficient.

Figure 2:
FIG. 2 illustrates, by way of example, a diagram of an embodiment of a view of an image and a solar ray in an image coordinate system.

FIG. 2 illustrates, by way of example, a diagram of an embodiment of a view of an image 218 and a solar ray 216 in an image coordinate system 200. The solar ray 216 is at an angle from a north-west axis (see compass). The image 218 is a rendered view of an embodiment of the image data 106. The image 218 includes an object with shadows. The direction of solar rays from the sun is indicated by the solar ray 216.

Figure 3:
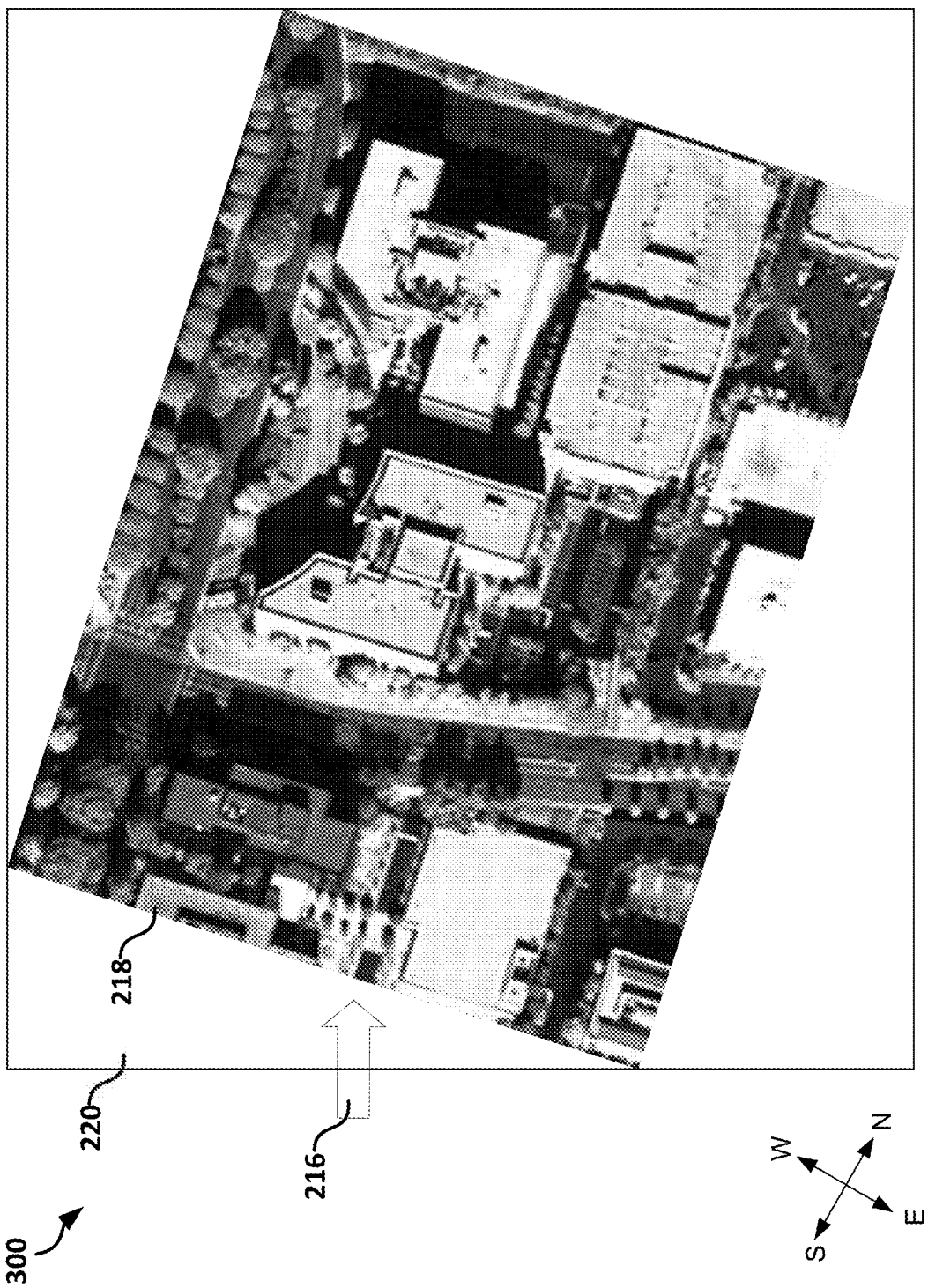
FIG. 3 illustrates, by way of example, a diagram of an embodiment of the image data projected to a solar coordinate system.

FIG. 3 illustrates, by way of example, a diagram of an embodiment of data of the image 218 projected to a solar coordinate system 220. The solar coordinate system 220 is shifted such that the solar ray 216 is perpendicular to columns of pixels in the solar coordinate system 220. In FIG. 3, the extent of the solar coordinate system is shown as encompassing the minimum bounding rectangle of the image 218. Note that the compass and image 218 are rotated relative their positions in FIG. 2.

A solar elevation angle is an angle of incidence from the sun to the target as measured from the sun relative to a plane tangent to the local surface normal. For example, if the sun is directly overhead, the solar elevation angle is 90 degrees. A solar azimuth angle is an angle from the target to the sun as measured clockwise to the sun with respect to true north in a plane tangent to the Earth's surface at the target. For example, if the sun is due west of the target, the solar azimuth angle is 270 degrees.

Figure 4:
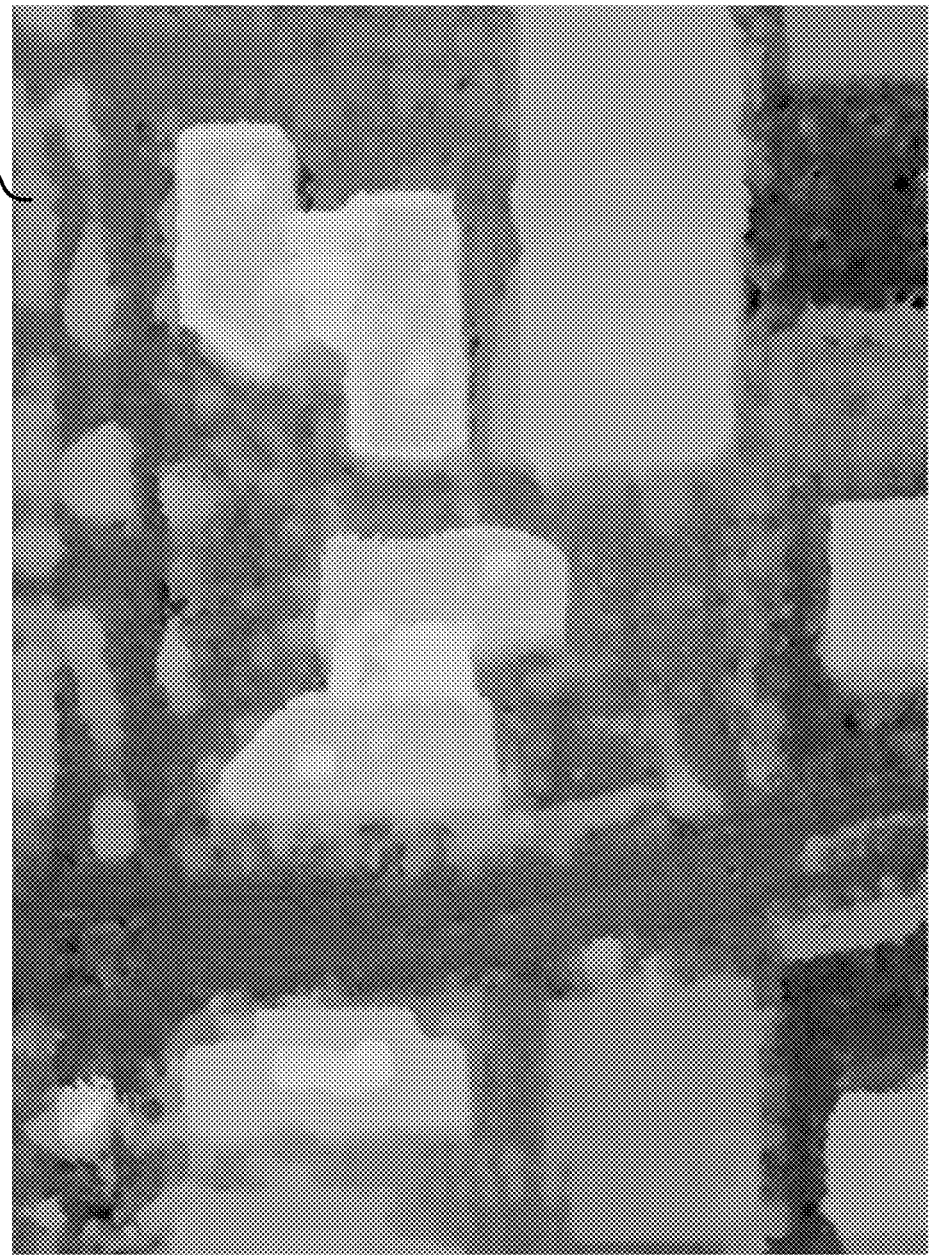
FIG. 4 illustrates, by way of example, a diagram of an embodiment of an image of the elevation data in the image coordinate system.
Figure 5:
FIG. 5 illustrates, by way of example, a diagram of an embodiment of the height data projected to the solar coordinate system.

FIG. 4 illustrates, by way of example, a diagram of an embodiment of an image 400 of the elevation data 104 in the image coordinate system. FIG. 5 illustrates, by way of example, a diagram of an embodiment of the height data 401 projected to the solar coordinate system. The projection can be performed in a manner similar to that described regarding FIG. 3.

Figure 6:
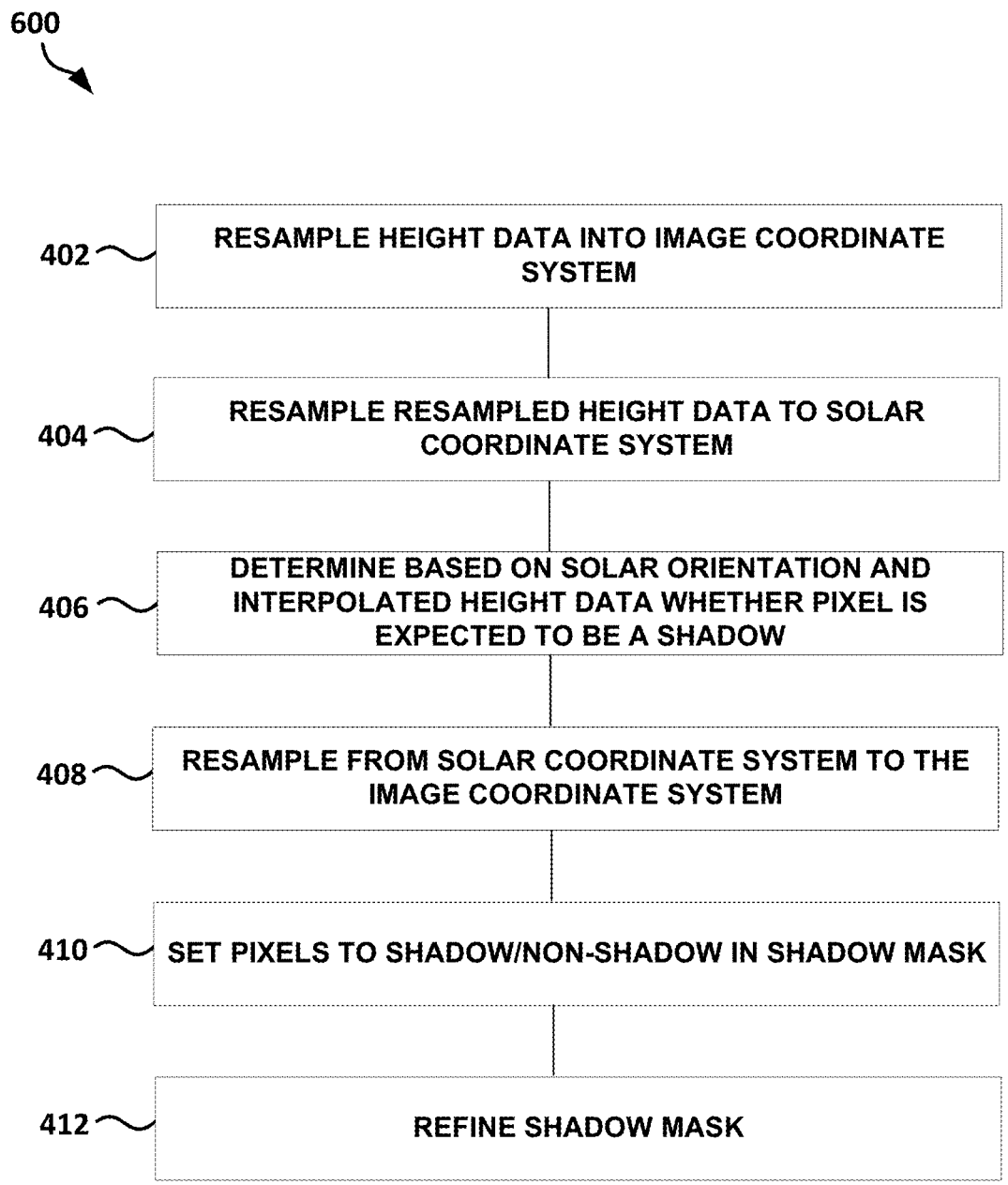
FIG. 6 illustrates, by way of example, a diagram of an embodiment of a method for generating a shadow mask.

FIG. 6 illustrates, by way of example, a diagram of an embodiment of a method 600 for generating a shadow mask. The method 600 can be performed by the shadow mask generation circuitry 102. The method 600 as illustrated includes resampling height data (e.g., the elevation data 104) into an image coordinate system, at operation 402; resampling height data into a solar coordinate system, at operation 404; determining based on solar ray orientation and interpolated height data whether pixel is expected to be a shadow pixel, at operation 406; resampling from solar coordinate system to the image coordinate system, at operation 408; setting pixels to shadow/non-shadow in shadow mask based on operation 406, in operation 410; and refining the shadow mask, at operation 412.

The operation 402 can include resampling from an irregularly-spaced point cloud to a regularly spaced grid in a ground-based or as-collected image coordinate system. The operation 402 can include, for each location in the output coordinate system (the image coordinate system) into which the elevation data 104 is being resampled, a list of input indexes to the elevation data 104 can be stored. If the elevation data 104 has a comparable resolution/spacing to the image coordinate system, just one index can be stored per position. The index can be based on the point of the elevation data 104 with the highest elevation. In other cases where the elevation data 104 is at higher resolution than that of the image coordinate system, saving multiple indexes can improve the results. This can be accomplished by projecting the 3D location into the image coordinate system via the appropriate camera model or transformation function.

In embodiments in which the elevation data 104 are resampled into an as-collected image coordinate system, occlusion detection can be performed. A maximal height of an object can be tracked per pixel and then analysis can be performed to detect cases where, for example, because of sparsity of 3D points of a side of building the only measurement that projects to a given pixel location may have originated from a lower surface that was obscured by a building or other object. This can be detected by finding higher elevation points on both sides of a given point that differ by more than a threshold amount, such as can be determined by the collection geometry. Other occlusion detection techniques may be used, such as a voxel-based approach that traverses up three-dimensional voxels towards an imaging device to determine if any intersections from higher surfaces exist.

Resampling of the elevation data 104 can be performed using indexes to the elevation data 104 from a 3×3 window surrounding the point to be resampled. If there are 3 points and the point to be resampled is found within the triangle forming the 3 points, then barycentric interpolation can be used to obtain an interpolated height at that x-y location. If there are 4 input points to use in resampling then two sets of 3 can be used to interpolate via barycentric interpolation and these interpolated results can be averaged. If there are more than 4 points, then a weighted average of all points can be used and the weights can be set to the reciprocal of the distance to the interpolation point. Note that the 3×3 window is merely an example and other window sizes can be used.

In embodiments in which the elevation data 104 is accurate, an interpolation can be improved by iteration. The elevation data 104 can be projected into the image coordinate system space and the height can be computed via a regular-grid-based interpolator, such as a 4×4 LaGrangian bicubic interpolator. This provides a roundtrip height that can be subtracted from the original height at the 3D location to obtain a delta height. This delta height can then be interpolated back to the output space and added to the interpolated height from the previous iteration. After one or more iterations, interpolated elevation data can be provided in the image coordinate system that best approximates consistency with the regular interpolation that can be performed in the opposite direction (or a convergence criterion can be used to stop iterating once the residual differences become less than some fraction of the estimated height errors).

There can be some gaps where there are not at least three elevation data points near a desired interpolation output point. In filling these gaps, the previous process can be repeated multiple times using an increasingly large window. For example, for the second iteration a 5×5 window rather than a 3×3 window could be used. Note that only locations which lack an interpolated height need to be processed in a given iteration. In many cases two iterations is sufficient. However, gaps in the elevation data 104 that remain can also be filled in using a mean interpolation of surrounding valid interpolated points within a 3×3 window. Multiple iterations of this hole-filling algorithm can fill in larger gaps.

More sophisticated hole-filling techniques can be helpful, such as performing planar fits from nearby 3D points. These fits can be performed in an over-determined fashion such as using a least squares fit so that residuals can validate or discredit the assumption of local planarity. Hole-filling can be important for the shadow mask creation techniques herein, because some height estimate is needed for the initial geometric-based shadow analysis. Slight inaccuracies due to hole-filling processes can be counter-acted by an intensity-based shadow refinement, such as operation 412.

The operation 404 can include computing parameters, such as solar ray angle and solar ray azimuth angle, for setting up the solar-oriented coordinate system. The operation 406 can include operations similar to those described about operation 402, with the destination coordinate system being the solar-oriented coordinate system rather than the image coordinate system.

The elevation data can be resampled to both the image coordinate system, at operation 402, and to the solar coordinate system, at operation 404. To understand why resampling to both coordinate systems can aid in accuracy, consider an embodiment in which the solar azimuth angle is 90 degrees off from the sensor (e.g., camera) azimuth angle. A small building occluded by a larger building in front of it from the perspective of the sensor can still cast a shadow in a part of an image that is seen by the sensor. The elevation information about this smaller building can be obtained from the elevation data 204 but may not be available from a height image in the image space.

Figure 7:
FIG. 7 illustrates, by way of example, a diagram of an embodiment of an intermediate shadow mask.

FIG. 7 illustrates, by way of example, a diagram of an embodiment of an intermediate shadow mask 700 in the solar-coordinate system (e.g., the shadow mask 112). The shadow mask 700 can be computed using a technique as described regarding FIG. 8 and elsewhere herein.

Figure 8:
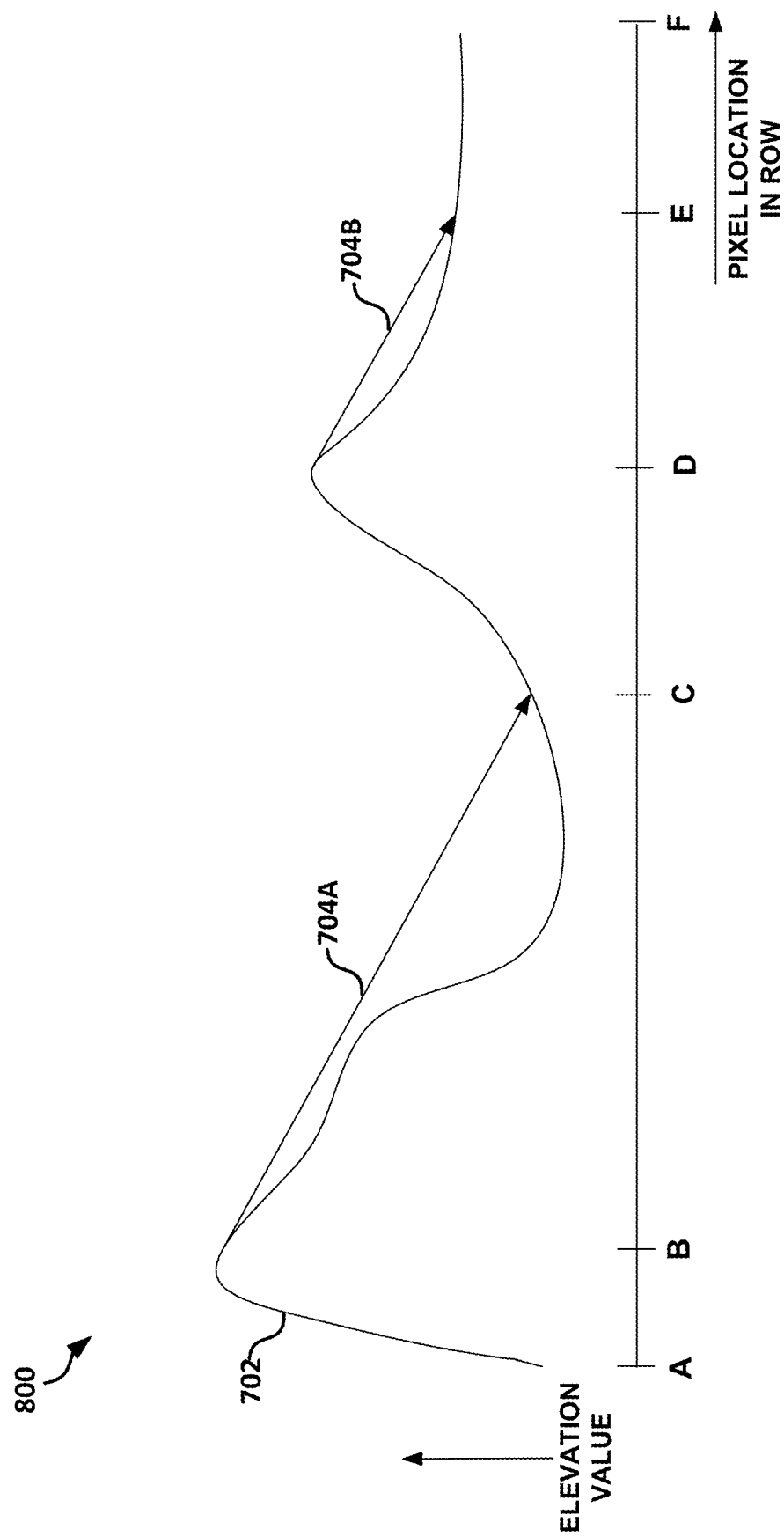
FIG. 8 illustrates, by way of example, an embodiment of a plot of elevation data vs pixel location for predicting shadow pixels in a row of pixels of the solar-coordinate system image.

FIG. 8 illustrates, by way of example, an embodiment of a plot 800 of elevation data vs pixel location for a row of pixels of an image in the solar-coordinate system (e.g., the image data 106 and the elevation data 104). The plot 800 can help explain a process of determining whether a pixel is expected to be a shadow or non-shadow, such as to create the shadow mask 700. The plot 800 includes elevation data on the Y-axis and pixel position consecutively from left to right on the X-axis. The elevation data, while normally discrete, is represented by a continuous line 702. Solar rays represented by lines 704A and 704B are illustrated in areas of shadow and at their estimated azimuth angle.

The letters along the X-axis indicate areas at which an expectation of shadow or non-shadow changes. For example, "B" indicates that the pixel corresponding to "B" is expected to be in shadow and every pixel between "B" and "C" is expected to be in shadow. In another example, "C" indicates that the pixel corresponding "C" is expected to be non-shadow and every pixel between "C" and "D" is expected to be non-shadow. A technique for determining whether a pixel is expected to be shadow is now provided.

The pixel at the left edge of the row of pixels is marked as being non-shadow or shadow and becomes a reference point. A slope between the reference point and the current pixel in the row (from left-to-right direction) can be determined for each pixel in the row. If the height is decreasing from the point to the reference point and the slope point is below the sun elevation angle (indicated by line 704A and 70B), that point can be marked as expected to be shadow. The sun elevation angle can then be projected on the continuous line to determine a next pixel that is expected to be in the sun. The pixel which the sun elevation angle (line 704A) intersects to the right of the current reference point is marked as expected to be sun.

Another way of stating this is, the line representing the sun elevation angle is superimposed on the continuous line from the reference point to a current point. If the current point is under a line without intersecting a line 704A-704B in the graph space, the pixel is marked as shadow. If the current point intersects a line at the sun elevation angle in graph space, it is marked as non-shadow.

In FIG. 8, the up-sun reference point is set at "A" and moving to the right along the solar ray direction the reference point continually replaced (since no points satisfy the condition of being in shadow) until point "B". Moving to the right from "B", all the points satisfy the slope condition (and are marked as shadow) until point "C", which becomes the new reference point. Proceeding to the right from "C", all the points fail the slope condition and the reference point is replaced until point "D". Using "D" as the reference, all the points past "D" satisfy the slope condition and are marked as being in shadow until point "E". Point "E" becomes the new reference point and no point past "E" meets the slope condition, so all the points after "E" are marked as being sun lit.

An efficient implementation of the procedure described above uses the following steps, provided in pseudocode, to make these shadow, non-shadow determinations. The overall goal can be thought of as computing a height relative to the maximum height of obstructed solar rays (or maxHeightOfObstructedRay) at each pixel position in the solar coordinate system, this entity will be referred to as deltaH. The deltaH can equal the height along the continuous line 702 minus the height at the line 704A or 704B.

Compute how much the height of a solar ray decreases as the column advances by 1 unit. This parameter is called colHtDecrementAmt. Equation 1 is an example of how to calculate colHtDecrementAmt:

$$\text{colHtDecrementAmt} = \text{colDistance} * \tan(\text{solarElevationAngle}) \qquad \text{Equation 1}$$

where colDistance represents the spacing between successive columns in the solar coordinate system A loop can be performed over rows of elevation data (e.g., represented by the line 702). The loop can include initializing maxHeightOfObstructedRays at the leftmost column to a height at that column. Let C be a current column index. For each C to the right of the leftmost column, compute/update maxHeightOfObstructedRays at each column based on deltaH[C] as follows.

$$\text{maxHeightOfObstructedRays} = \text{maxHeightOfObstructedRays} - \text{colHtDecrementAmt}$$

$$\text{delta}H[C] = \text{height}[C] - \text{maxHeightOfObstructedRays}$$

$$\text{if}(\text{delta}H[C] > 0) \text{maxHeightOfObstructedRays} = \text{height}[C]$$

The height[C] is the height at column C in the elevation data 704.

Determining whether the pixel in the image space is expected to be shadow or non-shadow can include resampling the determined deltaH[C] from the solar coordinate system to the input image space. A Gaussian-filter can be applied to the deltaH[C]. The Gaussian filter can include a 3×3 or another window size. The projection can be performed using a camera model or a rational function approximation (these may have been modified if necessary by a 2D-to-3D registration that ensures that imagery and elevation data are accurately registered).

A shadow decision can then be made in image coordinate space. A pixel can be considered non-shadow if deltaH≥0, else it can be a shadow for negative values of deltaH. An alternate version of the shadow mask that more aggressively labels shadows should also be computed based on a small positive value of deltaH whose value is based on the elevation data accuracy but should never get too close to colHtDecrementAmt and a setting that works well for many cases is to set the deltaH threshold based on about 0.25*colHtDecrementAmt, but it does not need to exceed the local elevation error expected value.

Operation 412 can include a technique that uses image intensities to improve an accuracy of the shadow mask generated through operation 410. The operation 412 can include assessing error sources to estimate a maximum number of pixels at the shadow edges that may be in error.

Figure 9:
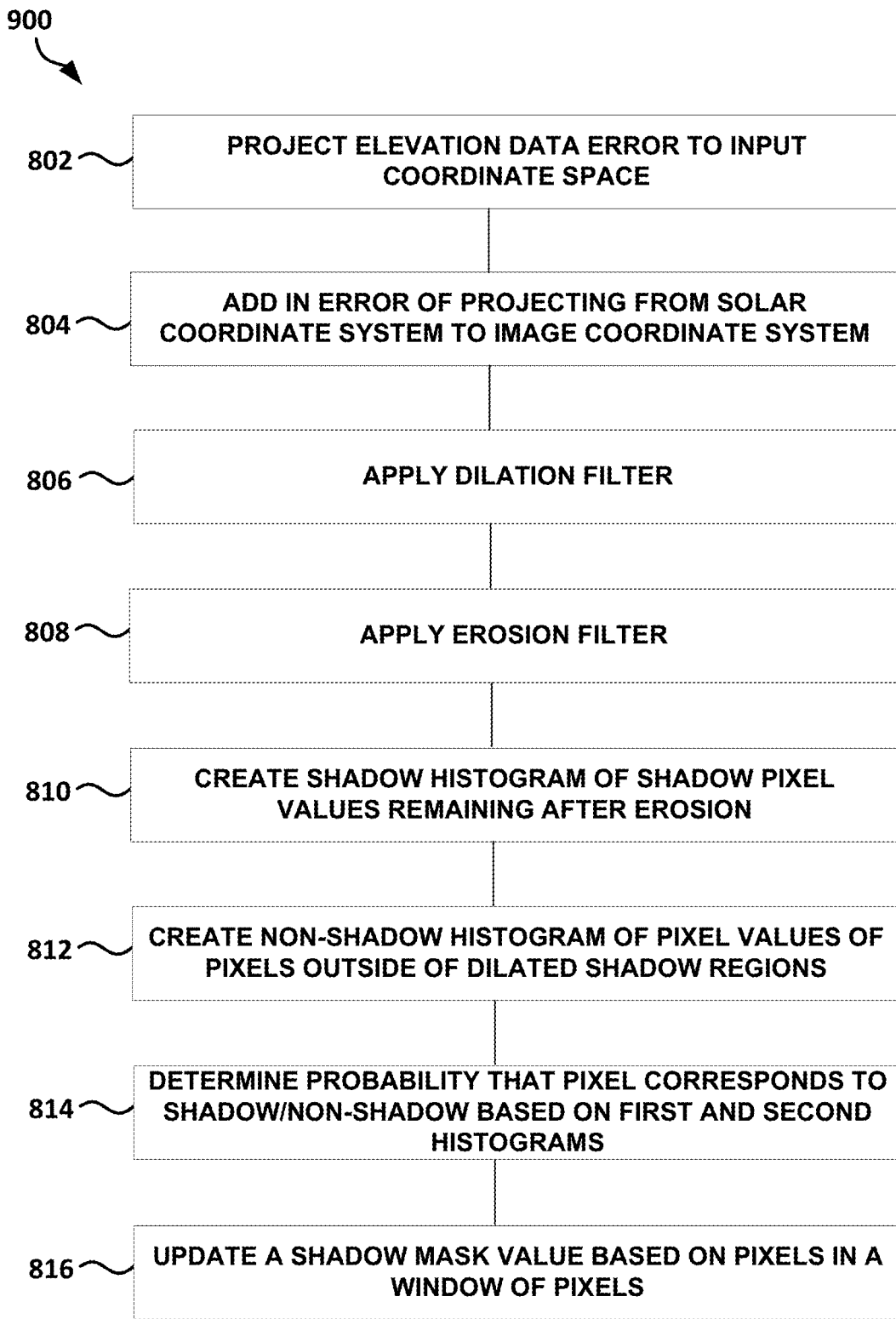
FIG. 9 illustrates, by way of example, a diagram of an embodiment of a shadow mask refining operation.

FIG. 9 illustrates, by way of example, a diagram of an embodiment of the operation 412. The operation 412 as illustrated includes projecting elevation data error to an input coordinate space, at operation 802; adding in error of projecting from solar coordinate system to an image coordinate system, at operation 804; applying a dilation filter (e.g., the dilated mask 114), at operation 806; applying an erosion filter (e.g., the eroded mask 116), at operation 808; creating a shadow histogram (e.g., the shadow histogram 118) of shadow pixel values remaining after erosion, at operation 810; creating a non-shadow histogram (e.g., the non-shadow histogram 120) of pixels outside of dilated shadow regions, at operation 812; determining a probability that a pixel corresponds to shadow/non-shadow based on first and non-shadow histograms, at operation 814; and updating a shadow max value based on pixels in a window of pixels, at operation 816.

The operation 412 can include, at operation 802, projecting x, y, and z-dimension error from the elevation data to the input image space to obtain max pixels in error (maximize between line and sample dimension). At operation 804, a contribution to the error of the mapping function (mapping the solar coordinate system to the image coordinate system) can be added to error determined at operation 802. The elevation error from operation 802 can be used to compute an effect on the projected shadow length by multiplying by the tangent of the sun elevation angle. This can provide an x-y offset in ground space that can then be mapped to input image space to get a pixel-based offset.

This number of pixels along the border of the shadow can be in error in the shadow mask. This number can determine how many times to perform a dilation morphological filtering operation of the shadow mask. This is, in part, because each 3×3 dilation filter can adjust the mask by one pixel in each dimension. Thus, this corresponds to the number of pixels by which the initial, geometric-derived shadow mask can be off by in each direction.

At operation 806, a dilation filter can be applied (e.g., iteratively) to the aggressive shadow mask. The number of iterations can be set to the number of pixels in error in the shadow mask as computed by operation 802 and 804. In each iteration a non-shadow value can be replaced with a shadow value if at least 3 (of a maximum of 8) neighboring pixels are shadows.

At operation 808, an erosion filter can be applied (e.g., iteratively). The number of iterations can be set to the number of pixels in error in the shadow mask as determined at operation 802 or 804. In each iteration a shadow value can be replaced with a non-shadow value if at least 3 (of a maximum of 8) neighboring pixels are non-shadows. The number of shadow pixels remaining after each erosion iteration can be tracked and a version of the shadow mask can be saved for the last iteration that has a statistically significant number of shadow pixels. Additional erosion iterations can be performed but those only affect the shadow mask used to guide the refinement process and not the shadow mask that guides the histogramming. The shadow-based histogramming that can be performed on intensities, can use this potentially slightly less eroded shadow mask.

The operations 806 or 808 can define a region of uncertainty in the shadow mask. Shadow refinement can be performed to improve the accuracy of the shadow mask in one or more of these regions.

Figure 10:
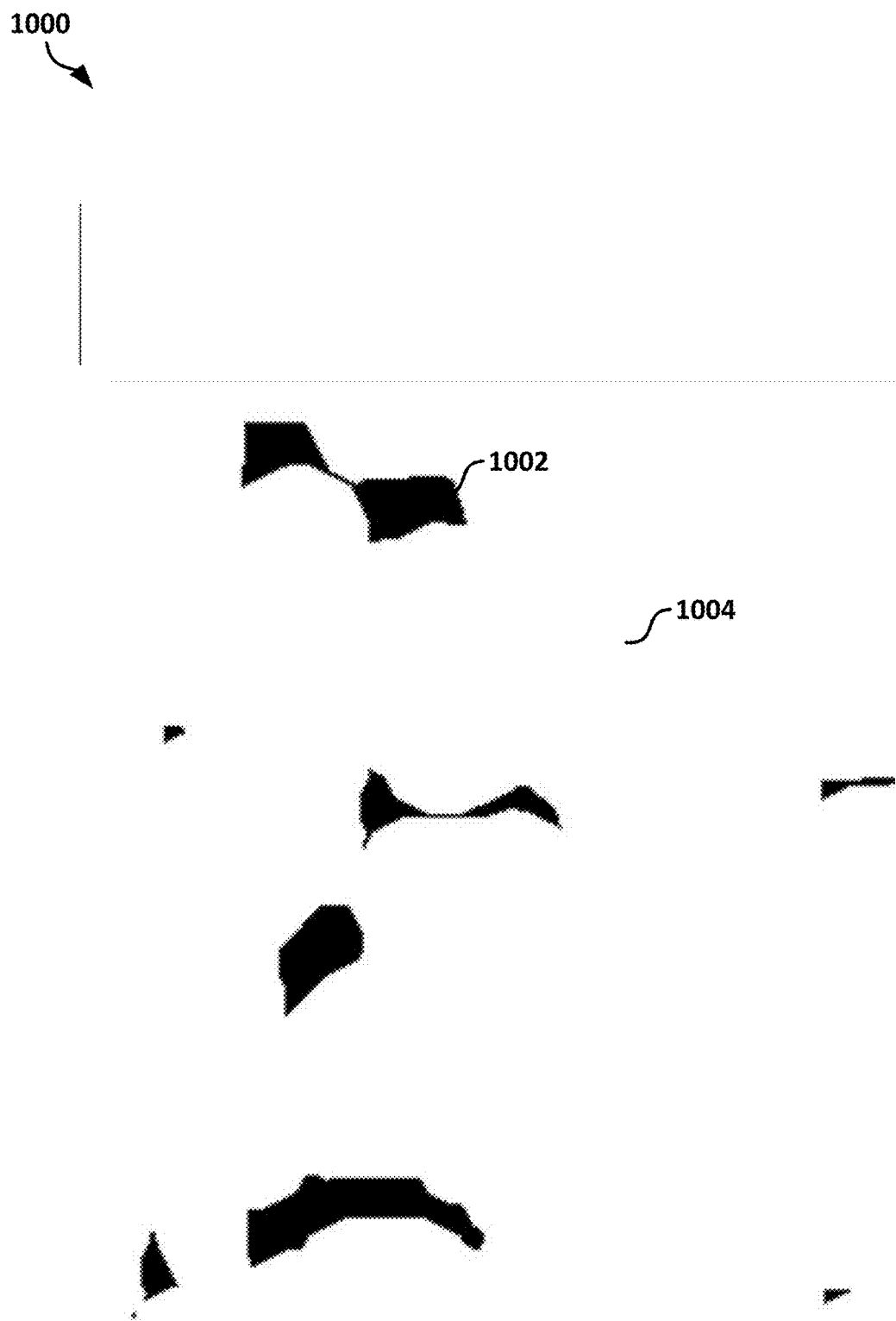
FIG. 10 illustrates, by way of example, a diagram of an embodiment of the shadow mask of FIG. 7 after an erosion is performed.

FIG. 10 illustrates, by way of example, a diagram of an embodiment of a shadow mask 1000 that includes the shadow mask 700 of FIG. 7 after an erosion, operation 806, is performed, such as to illustrate a view of the eroded mask 1000. The eroded mask 1000 as illustrated includes shadow mask values that remain as shadow values 1002, pixels that remain as non-shadow values 1004.

Figure 11:
FIG. 11 illustrates, by way of example, a diagram of an embodiment of the shadow mask of FIG. 7 after a dilation is performed.

FIG. 11 illustrates, by way of example, a diagram of an embodiment of a shadow mask 1100 that includes the shadow mask 700 of FIG. 7 after a dilation, operation 808, is performed, such as to illustrate a view of the dilated mask 1100. The dilated mask 1100 as illustrated includes shadow mask values that might remain as shadow values 1102, pixels that are confidently non-shadow values 1104.

At operation 810, a shadow histogram of the pixel values in the image data 106 corresponding to the pixels of the shadow values 1002 can be created. These pixels correspond to shadows with high confidence. At operation 812, a non-shadow histogram of the pixel values of the image data 106 corresponding to pixel locations where the eroded shadow that with high confidence are considered to be in non-shadows.

A probability (e.g., a Bayesian probability) that a pixel corresponds to shadow or non-shadow can be determined given an intensity value using the two histograms (e.g., smoothed versions of the two histograms), at operation 814. The amount of smoothing applied can depend on image size and the noise level of the imagery. A mean filter of about seven (7) bins produces satisfactory results for 11-bit images, such as are common for commercial satellite images. The probability of being a shadow for a given intensity, i, can equal the number of counts in the smoothed shadow histogram for bin, i, divided by the total number of counts at the bin as obtained by summing bin, i, from both histograms.

Note that, in some embodiments, the probabilities can be used in only a first refinement iteration to determine weights for how to compute average intensities of nearby shadows and non-shadows. Subsequent iterations of the refinement technique can use an estimated probability of shadow or non-shadow based on the shadow mask.

Operation 816 can include updating a maximum shadow value (e.g., a maximum pixel value below which the pixel is assumed to be a shadow). The operation 816 can be performed based on a window of pixels in the image and shadow mask.

As previously discussed, one or more operations of the method 900 can be performed in multiple iterations, such as two, three, four, five, or more iterations.

Figure 12:
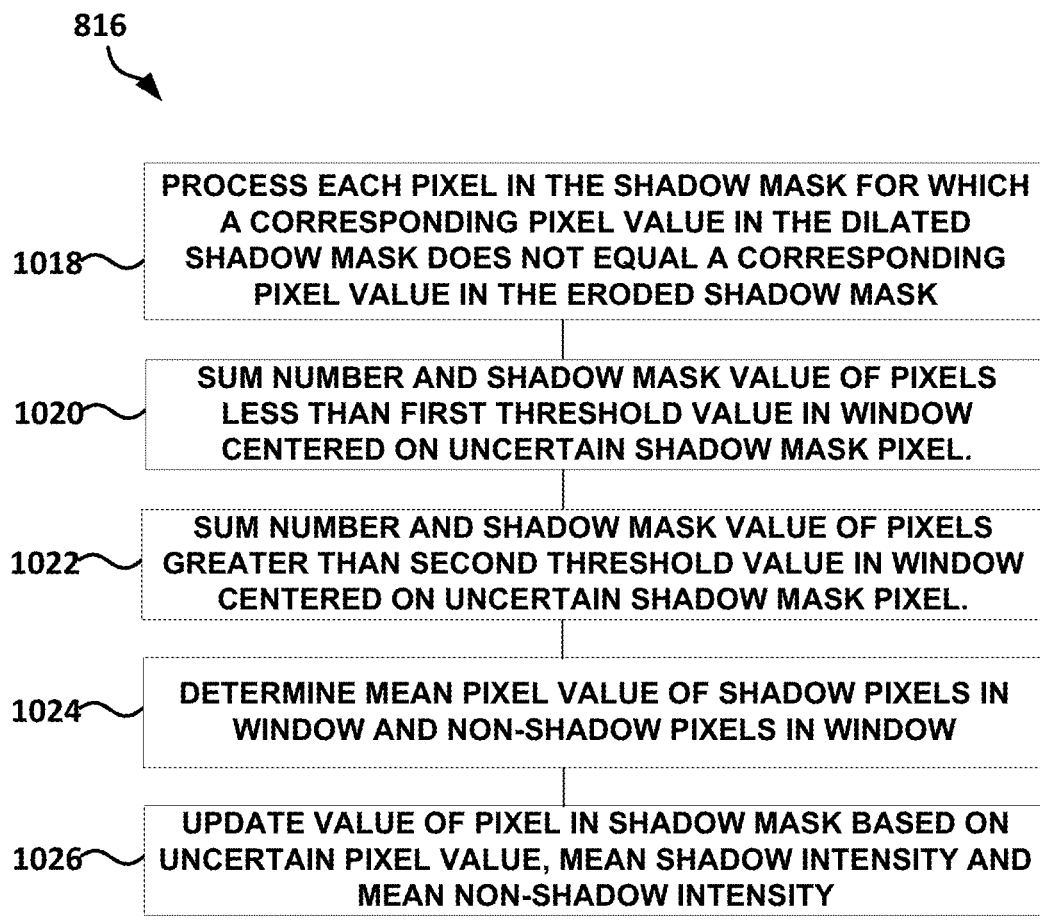
FIG. 12 illustrates, by way of example, a diagram of an embodiment of a method of performing a shadow mask refining operation.

FIG. 12 illustrates, by way of example, a diagram of an embodiment of a method of performing the operation 816. The method as illustrated in FIG. 12 includes processing each pixel in the shadow mask for which a corresponding pixel value in the dilated shadow mask does not equal a corresponding pixel value in the eroded shadow mask, at operation 1018; summing a number and shadow mask value of pixels less than a first threshold value in a window centered on uncertain shadow mask pixel, at operation 1020; summing a number and shadow mask value of pixels greater than a second threshold value in a window centered on uncertain shadow mask pixel, at operation 1022; determining a mean pixel value of shadow pixels in window and non-shadow pixels in window, at operation 1024; and updating a shadow value threshold based on uncertain pixel value, mean shadow intensity, and mean non-shadow intensity, at operation 1026. The window can include a square or other window of pixels. The window can include a 3×3, 5×5, 7×7, 9×9, 11×11, 13×13, 15×15, 17×17, 19×19, etc. or another window size. The window size can be dependent on a resolution of the image. For example, a 17×17 window can be used for an image with a resolution of about 0.5 meters.

At operation 1020, for each shadow mask value in the window less than the maximum shadow value (e.g., 25, which corresponds to a 75% chance the pixel is a shadow), a counter can be incremented. At operation 1020, the intensity value of the pixel in the window can be added to a total shadow value of the shadow pixels in the window. In one or more embodiments, the shadow values can be weighted in accord with a probability that the pixel corresponds to a shadow. For example, the weight can be greater for a pixel that is more likely a shadow as compared to a pixel that is less likely a shadow. As previously discussed, a different weighting can be used for a first iteration (where the shadow mask generally not be very accurate) and subsequent iterations in which the shadow mask, which is defined to estimate the probability that each pixel location is in shadow, can be used directly for the weighting.

At operation 1022, for each shadow mask value in the window greater than a minimum non-shadow value (e.g., 75, which corresponds to a 75% chance the pixel is a non-shadow), a counter can be increments. At operation 1022, the intensity value of the pixel in the window can be added to a total non-shadow value of the non-shadow pixels in the window. In one or more embodiments, the non-shadow values can be weighted in accord with a probability that the pixel corresponds to a non-shadow. For example, the weight can be greater for a pixel that is more likely a non-shadow as compared to a pixel that is less likely a non-shadow. As previously discussed, the weighting can be different for different iterations.

If a sufficient number of entries in the window for both shadow and non-shadow are each greater than a minimal number (e.g., 1%, or a greater or lesser percentage, of the number of pixels in the window being examined works well), then shadow value refinement can be performed using the window centered at this pixel which has an uncertain shadow assessment. If the number of entries in the window for both shadow and non-shadow are each greater than the minimal number of pixels in the window being examined, then sufficient statistics are available to perform shadow value refinement using the window centered at this uncertain pixel.

The operation 1024 can include dividing the total shadow value by the number of shadow pixels in the window. The operation 1024 can include dividing the total non-shadow value by the number of non-shadow pixels in the window. If the non-shadow mean determined at operation 1024 is greater than the shadow mean determined at operation 1024 by at least a threshold amount, then the value of the uncertain pixel in the shadow mask can be updated at operation 1026. The value of the pixel in the shadow mask can be updated as in Equation 2:

$$\text{ShadowVal}=100*((\text{intensity value of current pixel}-\text{mean shadow intensity value})/(\text{mean non-shadow intensity value}-\text{mean shadow intensity value})) \quad \text{Equation 2}$$

The ShadowVal should also be clamped to stay within the range of 0 to 100:

$$\text{ShadowVal}=\text{minimum}(\text{maximum}(0,\text{ShadowVal}),100)$$

Figure 13:
FIG. 13 illustrates, by way of example, a diagram of an embodiment of a shadow mask after refinement.

FIG. 13 illustrates, by way of example, a diagram of an embodiment a final shadow mask image 1300 after refinement. Comparing the shadow mask image 1300 to that in FIG. 7 shows the adjustments made by the refinement process.

The refined shadow mask can be used to update the elevation data to make the elevation data more accurate. The shadow mask, which can represent the fraction of a given pixel that is a non-shadow, can be projected from the image space back to the solar coordinate system. Then, for every sequence of consecutive shadows along a row a shadow distance can be used to determine a height change between those pixel locations. The height change can equal the shadow length in pixels times the ground sample distance times the tangent of the solar elevation angle. Since the shadow mask generally has sub-pixel accuracy, this shadow distance can be computed to sub-pixel accuracy. For some embodiments, multiple images are available from which to use shadow results to refine the same elevation data and can provide a robustness by combining height adjustments (e.g., by taking a mean or median adjustment and removing outliers).

Figure 14:
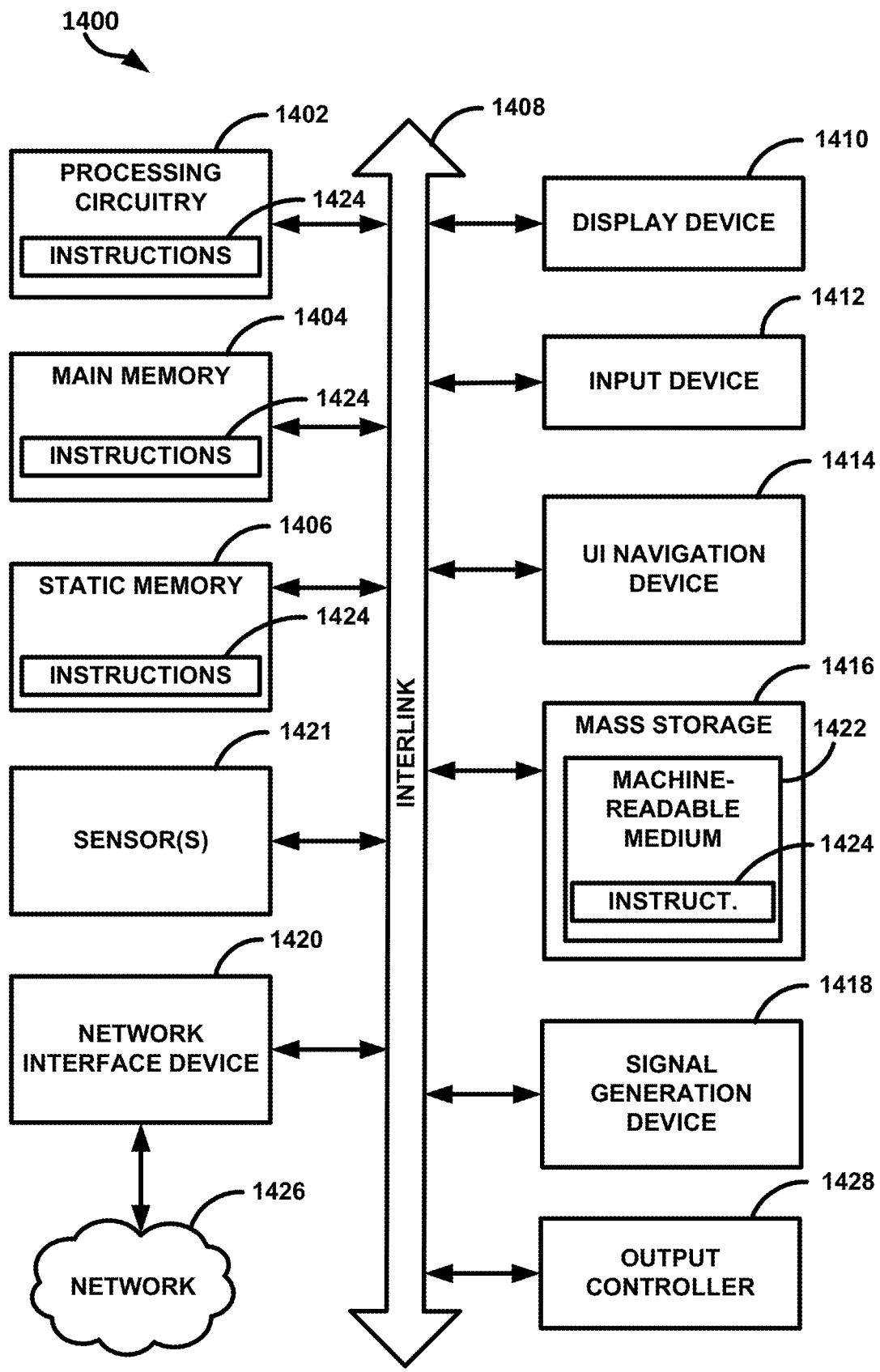
FIG. 14 illustrates, by way of example, a block diagram of an embodiment of a machine on which one or more of the methods, such as those discussed about FIGS. 4, 9, and 12 and elsewhere herein can be implemented.

FIG. 14 illustrates, by way of example, a block diagram of an embodiment of a machine 1400 on which one or more of the methods, such as those discussed about FIGS. 4, 9, and 12 and elsewhere herein can be implemented. In one or more embodiments, one or more items of the shadow mask generation circuitry 102 can be implemented by the machine 1400. In alternative embodiments, the machine 1400 operates as a standalone device or may be connected (e.g., networked) to other machines. In one or more embodiments, the shadow mask generation circuitry 102 can include one or more of the items of the machine 1400. In a networked deployment, the machine 1400 may operate in the capacity of a server or a client machine in server-client network environment, or as a peer machine in a peer-to-peer (or distributed) network environment. The machine 1400 may be a personal computer (PC), a tablet PC, a set-top box (STB), a Personal Digital Assistant (PDA), a cellular telephone, a web appliance, a network router, switch or bridge, embedded computer or hardware, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine 1400 includes processing circuitry 1402 (e.g., a hardware processor, such as can include a central processing unit (CPU), a graphics processing unit (GPU), an application specific integrated circuit, circuitry, such as one or more transistors, resistors, capacitors, inductors, diodes, logic gates, multiplexers, oscillators, buffers, modulators, regulators, amplifiers, demodulators, or radios (e.g., transmit circuitry or receive circuitry or transceiver circuitry, such as radio frequency (RF) or other electromagnetic, optical, audio, non-audible acoustic, or the like), sensors 1421 (e.g., a transducer that converts one form of energy (e.g., light, heat, electrical, mechanical, or other energy) to another form of energy), or the like, or a combination thereof), a main memory 1404 and a static memory 1406, which communicate with each other and all other elements of machine 1400 via a bus 1408. The transmit circuitry or receive circuitry can include one or more antennas, oscillators, modulators, regulators, amplifiers, demodulators, optical receivers or transmitters, acoustic receivers (e.g., microphones) or transmitters (e.g., speakers) or the like. The RF transmit circuitry can be configured to produce energy at a specified primary frequency to include a specified harmonic frequency.

The machine 1400 (e.g., computer system) may further include a video display unit 1410 (e.g., a liquid crystal display (LCD) or a cathode ray tube (CRT)). The machine 1400 also includes an alphanumeric input device 1412 (e.g., a keyboard), a user interface (UI) navigation device 1414 (e.g., a mouse), a disk drive or mass storage unit 1416, a signal generation device 1418 (e.g., a speaker) and a network interface device 1420.

The mass storage unit 1416 includes a machine-readable medium 1422 on which is stored one or more sets of instructions and data structures (e.g., software) 1424 embodying or utilized by any one or more of the methodologies or functions described herein. The instructions 1424 may also reside, completely or at least partially, within the main memory 1404 and/or within the processing circuitry 1402 during execution thereof by the machine 1400, the main memory 1404 and the processing circuitry 1402 also constituting machine-readable media. One or more of the main memory 1404, the mass storage unit 1416, or other memory device can store the job data, transmitter characteristics, or other data for executing the method of FIG. 4, 9, or 12.

The machine 1400 as illustrated includes an output controller 1428. The output controller 1428 manages data flow to/from the machine 1400. The output controller 1428 is sometimes called a device controller, with software that directly interacts with the output controller 1428 being called a device driver.

While the machine-readable medium 1422 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that can store, encode or carry instructions for execution by the machine and that cause the machine to perform any one or more of the methodologies of the present invention, or that can store, encode or carry data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1424 may further be transmitted or received over a communications network 1426 using a transmission medium. The instructions 1424 may be transmitted using the network interface device 1420 and any one of several well-known transfer protocols (e.g., hypertext transfer protocol (HTTP), user datagram protocol (UDP), transmission control protocol (TCP)/internet protocol (IP)). The network 1426 can include a point-to-point link using a serial protocol, or other well-known transfer protocol. Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that can store, encode or carry instructions for execution by the machine, and includes digital or analog communications signals or other intangible media to facilitate communication of such software.

Examples and Additional Notes

Example 1 can include a non-transitory machine-readable medium including instructions that, when executed by a machine, cause the machine to perform operations comprising determining, based on elevation data of a geographic region corresponding to a location at which an image was captured and a solar elevation angle at a time the image was captured, whether each pixel of the image is a shadow or a non-shadow to create a shadow mask of the image, generating an eroded shadow mask that includes the shadow mask with a specified number of pixel values from a perimeter of each shadow in the shadow mask changed to respective values corresponding to non-shadows, generating a dilated shadow mask that includes the specified number of pixel values in the shadow mask changed to values corresponding to shadows, and refining the shadow mask using the image, the eroded shadow mask, and the dilated shadow mask.

In Example 2, Example 1 can further include, wherein refining the shadow mask using the eroded shadow mask and the dilated shadow mask includes identifying a pixel in the dilated shadow mask that includes a value different from a corresponding pixel in the eroded shadow mask, for each pixel in a window of pixels centered on the identified pixel that includes a shadow mask value less than a shadow threshold, increment a shadow counter and add the corresponding pixel value to a total shadow value, for each pixel in the window of pixels that includes a shadow mask value greater than a non-shadow threshold, increment a non-shadow counter and add the corresponding pixel value to a total non-shadow value, determine a mean shadow value based on the shadow counter and total shadow value and a mean non-shadow value based on the non-shadow counter and total non-shadow value, and update the value of the shadow mask pixel based on the intensity of that pixel and the determined mean shadow value and mean non-shadow value.

In Example 3, Example 2 can further include, wherein the operations comprise generating a shadow histogram of non-shadow values in the complement of the dilated shadow mask, and generating a non-shadow histogram of shadow values in the eroded shadow mask.

In Example 4, Example 3 can further include, wherein the operations further comprise smoothing the shadow histogram and the non-shadow histogram; and estimating a probability that a pixel corresponds to a shadow based on the smoothed shadow histogram and the smoothed non-shadow histogram.

In Example 5, Example 4 can further include, wherein the operations further comprise weighting, based on a likelihood determined based on a number of shadow values in each bin of the shadow histogram and a sum of entries in a corresponding bin of the non-shadow histogram and the shadow histogram, the shadow value, and determining, based on the weighted shadow value, a weighted non-shadow value.

In Example 6, Example 5 can further include, wherein weighting the values of the total shadow value include identifying how many pixels in the non-shadow histogram are in a bin corresponding to the value of that pixel and dividing by a total number of pixels in the bin of the non-shadow histogram and a corresponding bin the shadow histogram.

In Example 7, at least one of Examples 5-6 can further include, wherein weighting the values of the total non-shadow value include identifying how many pixels in the shadow histogram are in a bin corresponding to the value of that pixel and dividing by a total number of pixels in the bin of the non-shadow histogram and a corresponding bin the shadow histogram.

In Example 8, at least one of Examples 1-7 can further include, wherein the operations further include projecting the image data to a solar coordinate system in which a direction of solar rays from the sun are perpendicular to columns of pixels of the image data, and projecting the elevation data to the solar coordinate system.

In Example 9, Example 8 can further include, wherein determining whether each pixel of the image is a shadow or a non-shadow to create a shadow mask of the image occurs in the solar coordinate system and the operations further include projecting the shadow mask to an image coordinate system accounting for an orientation of a camera relative to the geographic location.

Example 10 can include a method for generating a refined shadow mask, the method comprising determining, based on elevation data of a geographic region corresponding to a location at which an image was captured and a solar elevation angle at a time the image was captured, whether each pixel of the image is a shadow or a non-shadow to create a shadow mask of the image, generating an eroded shadow mask that includes the shadow mask with a specified number of pixels from a perimeter of each shadow in the shadow mask changed to respective values corresponding to non-shadows, generating a dilated shadow mask that includes the specified number of pixels in the shadow mask changed to values corresponding to shadows, and refining the shadow mask using the eroded shadow mask and the dilated shadow mask to create a refined shadow mask.

In Example 11, Example 10 can further include, wherein refining the shadow mask using the eroded shadow mask and the dilated shadow mask includes identifying a pixel in the dilated shadow mask that includes a value different from a corresponding pixel in the eroded shadow mask, for each pixel in a window of pixels centered on the identified pixel that includes a value less than a shadow threshold, increment a shadow counter and add the value to a total shadow value, for each pixel in the window of pixels that includes value greater than a non-shadow threshold, increment a non-shadow counter and add the value to a total shadow value, determine a mean shadow value based on the shadow counter and total shadow value and a mean non-shadow value based on the non-shadow counter and total non-shadow value, and update the value of the pixel based on the determined mean shadow value and mean non-shadow value.

In Example 12, Example 11 can further include generating a shadow histogram of non-shadow values in the dilated shadow mask, and generating a non-shadow histogram of shadow values in the eroded shadow mask.

In Example 13, Example 12 can further include weighting, based on a likelihood determined based on the first and non-shadow histogram, shadow values, and weighting, based on a likelihood determined based on the first and non-shadow histogram, non-shadow values.

In Example 14, Example 13 can further include, wherein weighting the values of the total shadow value include identifying how many pixels in the non-shadow histogram are in a bin corresponding to the value of that pixel and dividing by a total number of pixels in the bin of the non-shadow histogram and a corresponding bin the shadow histogram.

In Example 15, at least one of Examples 13-14 can further include, wherein weighting the values of the total non-shadow value include identifying how many pixels in the shadow histogram are in a bin corresponding to the value of that pixel and dividing by a total number of pixels in the bin of the non-shadow histogram and a corresponding bin the shadow histogram.

In Example 16, at least one of Examples 10-15 can further include projecting the image data to a solar coordinate system in which a direction of solar rays from the sun are perpendicular to columns of pixels of the image data, and projecting the elevation data to the solar coordinate system.

In Example 17, Example 16 can further include, wherein determining whether each pixel of the image is a shadow or a non-shadow to create a shadow mask of the image occurs in the solar coordinate system and the operations further include projecting the shadow mask to an image coordinate system accounting for an orientation of a camera relative to the geographic location.

Example 18 can include processing circuitry, a memory including program instructions that, when executed the processing circuitry, configure the processing circuitry to determine, based on elevation data of a geographic region corresponding to a location at which an image was captured and a solar elevation angle at a time the image was captured, whether each pixel of the image is a shadow or a non-shadow to create a shadow mask of the image, generate an eroded shadow mask that includes the shadow mask with a specified number of pixels from a perimeter of each shadow in the shadow mask changed to respective values corresponding to non-shadows, generate a dilated shadow mask that includes the specified number of pixels in the shadow mask changed to values corresponding to shadows, generate a shadow histogram of non-shadow values in the dilated shadow mask, generate a non-shadow histogram of shadow values in the eroded shadow mask, and refine the shadow mask using the eroded shadow mask, the dilated shadow mask, the shadow histogram, and the non-shadow histogram.

In Example 19, Example 18 can further include, wherein the program instructions for refining the shadow mask using the eroded shadow mask and the dilated shadow mask include instructions that further configure the processing circuitry to identify a pixel in the dilated shadow mask that includes a value different from a corresponding pixel in the eroded shadow mask, for each pixel in a window of pixels centered on the identified pixel that includes a value less than a shadow threshold, increment a shadow counter and add the value to a total shadow value, for each pixel in the window of pixels that includes value greater than a non-shadow threshold, increment a non-shadow counter and add the value to a total shadow value, determine a mean shadow value based on the shadow counter and total shadow value and a mean non-shadow value based on the non-shadow counter and total non-shadow value, and update the value of the pixel based on the determined mean shadow value and mean non-shadow value.

In Example 20, at least one of Examples 18-19 can further include, wherein the program instructions further configure the processing circuitry to project the image data to a solar coordinate system in which a direction of solar rays from the sun are perpendicular to columns of pixels of the image data, and project the elevation data to the solar coordinate system.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A non-transitory machine-readable medium including instructions that, when executed by a machine, cause the machine to perform operations comprising:
   determining, based on elevation data of a geographic region corresponding to a location at which an image was captured and a solar elevation angle at a time the image was captured, whether each pixel of the image is a shadow or a non-shadow to create a shadow mask of the image;
   generating an eroded shadow mask that includes the shadow mask within a specified number of pixel values from a perimeter of each shadow in the shadow mask changed to respective values corresponding to non-shadows;
   generating a dilated shadow mask that includes the specified number of pixel values in the shadow mask changed to values corresponding to shadows; and
   refining the shadow mask using the image, the eroded shadow mask, and the dilated shadow mask including identifying a pixel in the dilated shadow mask that includes a value different from a corresponding pixel in the eroded shadow mask, determine, for each identified pixel, a mean shadow value based on pixels in a window of pixels centered on the identified pixel that include a shadow mask value less than a shadow threshold, determine, for each identified pixel, a mean non-shadow value based on pixels in the window that include a shadow mask value greater than a non-shadow threshold, and update the value of the shadow mask pixel based on the intensity of that pixel and the determined mean shadow value and mean non-shadow value.

2. The non-transitory machine-readable medium of claim 1, wherein the operations comprise:
   generating a shadow histogram of non-shadow values in the complement of the dilated shadow mask; and
   generating a non-shadow histogram of shadow values in the eroded shadow mask.

3. The non-transitory machine-readable medium of claim 2, wherein the operations further comprise:
   smoothing the shadow histogram and the non-shadow histogram; and
   estimating a probability that a pixel corresponds to a shadow based on the smoothed shadow histogram and the smoothed non-shadow histogram.

4. The non-transitory machine-readable medium of claim 3, wherein the operations further comprise:
   weighting, based on a likelihood determined based on a number of shadow values in each bin of the shadow histogram and a sum of entries in a corresponding bin of the non-shadow histogram and the shadow histogram, the shadow value; and
   determining, based on the weighted shadow value, a weighted non-shadow value.

5. The non-transitory machine-readable medium of claim 4, wherein weighting the values of the total shadow value include identifying how many pixels in the non-shadow histogram are in a bin corresponding to the value of that pixel and dividing by a total number of pixels in the bin of the non-shadow histogram and a corresponding bin the shadow histogram.

6. The non-transitory machine-readable medium of claim 4, wherein weighting the values of the total non-shadow value include identifying how many pixels in the shadow histogram are in a bin corresponding to the value of that pixel and dividing by a total number of pixels in the bin of the non-shadow histogram and a corresponding bin the shadow histogram.

7. The non-transitory machine-readable medium of claim 1, wherein the operations further include:
   projecting the image data to a solar coordinate system in which a direction of solar rays from the sun are perpendicular to columns of pixels of the image data; and
   projecting the elevation data to the solar coordinate system.

8. The non-transitory machine-readable medium of claim 7, wherein determining whether each pixel of the image is a shadow or a non-shadow to create a shadow mask of the image occurs in the solar coordinate system and the operations further include projecting the shadow mask to an image coordinate system accounting for an orientation of a camera relative to the geographic location.

9. A method for generating a refined shadow mask, the method comprising:
   determining, based on elevation data of a geographic region corresponding to a location at which an image was captured and a solar elevation angle at a time the image was captured, whether each pixel of the image is a shadow or a non-shadow to create a shadow mask of the image;
   generating an eroded shadow mask that includes the shadow mask with a specified number of pixels from a perimeter of each shadow in the shadow mask changed to respective values corresponding to non-shadows;
   generating a dilated shadow mask that includes the specified number of pixels in the shadow mask changed to values corresponding to shadows; and
   refining the shadow mask using the eroded shadow mask and the dilated shadow mask to create a refined shadow mask including identifying a pixel in the dilated shadow mask that includes a value different from a corresponding pixel in the eroded shadow mask, detei mine, for each identified pixel, a mean shadow value based on pixels in a window of pixels centered on the identified pixel that include a shadow mask value less than a shadow threshold, determine, for each identified pixel, a mean non-shadow value based on pixels in the window that include a shadow mask value greater than a non-shadow threshold and update the value of the shadow mask pixel based on the intensity of that pixel and the determined mean shadow value and mean non-shadow value.

10. The method of claim 9, further comprising:
generating a shadow histogram of non-shadow values in the dilated shadow mask; and
generating a non-shadow histogram of shadow values in the eroded shadow mask.

11. The method of claim 10, further comprising:
weighting, based on a likelihood determined based on the first and non-shadow histogram, shadow values; and
weighting, based on a likelihood determined based on the first and non-shadow histogram, non-shadow values.

12. The method of claim 11, wherein weighting the values of the total shadow value include identifying how many pixels in the non-shadow histogram are in a bin corresponding to the value of that pixel and dividing by a total number of pixels in the bin of the non-shadow histogram and a corresponding bin the shadow histogram.

13. The method of claim 11, wherein weighting the values of the total non-shadow value include identifying how many pixels in the shadow histogram are in a bin corresponding to the value of that pixel and dividing by a total number of pixels in the bin of the non-shadow histogram and a corresponding bin of the shadow histogram.

14. The method of claim 9, further comprising:
projecting the image data to a solar coordinate system in which a direction of solar rays from the sun are perpendicular to columns of pixels of the image data; and
projecting the elevation data to the solar coordinate system.

15. The method of claim 14, wherein determining whether each pixel of the image is a shadow or a non-shadow to create a shadow mask of the image occurs in the solar coordinate system and the operations further include projecting the shadow mask to an image coordinate system accounting for an orientation of a camera relative to the geographic location.

16. A system comprising:
processing circuitry;
a memory including program instructions that, when executed the processing circuitry, configure the processing circuitry to:

determine, based on elevation data of a geographic region corresponding to a location at which an image was captured and a solar elevation angle at a time the image was captured, whether each pixel of the image is a shadow or a non-shadow to create a shadow mask of the image;

generate an eroded shadow mask that includes the shadow mask with a specified number of pixels from a perimeter of each shadow in the shadow mask changed to respective values corresponding to non-shadows;

generate a dilated shadow mask that includes the specified number of pixels in the shadow mask changed to values corresponding to shadows;

generate a shadow histogram of non-shadow values in the dilated shadow mask;

generate a non-shadow histogram of shadow values in the eroded shadow mask; and refine the shadow mask using the eroded shadow mask, the dilated shadow mask, the shadow histogram, and the non-shadow histogram including identifying a pixel in the dilated shadow mask that includes a value different from a corresponding pixel in the eroded shadow mask, determine, for each identified pixel, a mean shadow value based on pixels in a window of pixels centered on the identified pixel that include a shadow mask value less than a shadow threshold, determine, for each identified pixel, a mean non-shadow value based on pixels in the window that include a shadow mask value greater than a non-shadow threshold, and update the value of the shadow mask pixel based on the intensity of that pixel and the determined mean shadow value and mean non-shadow value.

17. The system of claim 16, wherein the program instructions further configure the processing circuitry to:
project the image data to a solar coordinate system in which a direction of solar rays from the sun are perpendicular to columns of pixels of the image data; and
project the elevation data to the solar coordinate system.

* * * * *

UNITED STATES PATENT AND TRADEMARK OFFICE
CERTIFICATE OF CORRECTION

PATENT NO. : 10,553,020 B1
APPLICATION NO. : 15/926285
DATED : February 4, 2020
INVENTOR(S) : Hainline et al.

Page 1 of 1

It is certified that error appears in the above-identified patent and that said Letters Patent is hereby corrected as shown below:

On the Title Page

Item [73], Column 1, Line 1, delete "Ratheon" and insert --Raytheon-- therefor

In the Specification

Column 3, Line 28, delete "110" and insert --112-- therefor

Column 7, Line 23, delete "204" and insert --104-- therefor

Column 7, Line 58, delete "70B)," and insert --704B),-- therefor

In the Claims

Column 18, Lines 60-61, Claim 9, delete "deteimine," and insert --determine,-- therefor Column 18, Line 67, Claim 9, delete "threshold" and insert --threshold,-- therefor Signed and Sealed this
Twenty-second Day of September, 2020

Andrei Iancu
*Director of the United States Patent and Trademark Office*